United States Patent
Tagami et al.

(10) Patent No.: US 8,140,552 B2
(45) Date of Patent: Mar. 20, 2012

(54) METHOD AND APPARATUS FOR OPTIMIZING LEAD TIME FOR SERVICE PROVISIONING

(75) Inventors: Masatoshi Tagami, Chigasaki (JP); Yoshinori Tanaka, Yokohama (JP); Katsuyoshi Yamamoto, Machida (JP)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 12/233,921

(22) Filed: Sep. 19, 2008

(65) Prior Publication Data

US 2010/0082528 A1    Apr. 1, 2010

(51) Int. Cl.
*G06F 17/30* (2006.01)

(52) U.S. Cl. ........................................ 707/758
(58) Field of Classification Search .................... 707/758
See application file for complete search history.

(56) References Cited

U.S. PATENT DOCUMENTS

| | | | | |
|---|---|---|---|---|
| 5,537,592 A * | 7/1996 | King et al. | ...... | 707/756 |
| 5,805,898 A * | 9/1998 | Barsness et al. | ...... | 717/175 |
| 5,920,846 A * | 7/1999 | Storch et al. | ...... | 705/7.14 |
| 7,120,559 B1 * | 10/2006 | Williams et al. | ...... | 702/185 |
| 7,496,912 B2 * | 2/2009 | Keller et al. | ...... | 717/174 |
| 7,840,957 B2 * | 11/2010 | Kumashiro et al. | ...... | 717/173 |
| 7,856,415 B2 * | 12/2010 | Gatti | ...... | 707/602 |
| 2002/0143823 A1 * | 10/2002 | Stevens | ...... | 707/523 |
| 2004/0153693 A1 * | 8/2004 | Fisher et al. | ...... | 714/4 |
| 2006/0047813 A1 * | 3/2006 | Aggarwal et al. | ...... | 709/226 |
| 2007/0016764 A1 * | 1/2007 | Arnfield et al. | ...... | 713/1 |
| 2007/0016907 A1 * | 1/2007 | Benedetti et al. | ...... | 718/104 |
| 2007/0094396 A1 | 4/2007 | Takano et al. | | |
| 2007/0180061 A1 | 8/2007 | Bantz et al. | | |
| 2007/0240162 A1 | 10/2007 | Coleman et al. | | |
| 2007/0268516 A1 * | 11/2007 | Bugwadia et al. | ...... | 358/1.15 |
| 2007/0297350 A1 | 12/2007 | Eilam et al. | | |
| 2008/0022263 A1 * | 1/2008 | Bak et al. | ...... | 717/136 |

FOREIGN PATENT DOCUMENTS

| | | |
|---|---|---|
| JP | 2005-141605 | 6/2005 |
| JP | 2006-343899 | 12/2006 |
| JP | 2007-114983 | 5/2007 |

\* cited by examiner

*Primary Examiner* — Sheree Brown
*Assistant Examiner* — Michael Le
(74) *Attorney, Agent, or Firm* — Cantor Colburn LLP

(57) ABSTRACT

A method for optimizing lead time for service provisioning for a request from a customer includes storing a record of installation and configuration times for each hardware and software configuration in a database, and then calculating success rates and failure rates for each hardware and software configuration. A manual installation time for the request is set in the event of failure. The necessary time to prepare the system fulfilling the customer request is then determined and displayed in the data center.

15 Claims, 8 Drawing Sheets

- MACHINE LIST

| ID | MACHINE NAME | TYPE | MODEL |
|---|---|---|---|
| 00001 | IBM BLADE HS20 | HS20 | - |
| 00002 | IBM BLADE HS21 | HS21 | - |

- LIST OF ADMINISTERED MACHINES

| ADMINISTRATION ID | MACHINE ID | NO. OF CPUs | MEMORY SIZE (GB) | INTERNAL STORAGE (GB) |
|---|---|---|---|---|
| A0001 | 00001 | 1 | 4 | 35 |
| A0002 | 00001 | 1 | 6 | 35 |
| A0003 | 00001 | 2 | 8 | 70 |
| A0004 | 00002 | 2 | 4 | 70 |
| A0005 | 00002 | 2 | 4 | 70 |
| A0006 | 00002 | 2 | 8 | 70 |

FIG. 4

● ADMINISTERED OS LIST

| ID | OS TYPE | OS NAME | VERSION | FP LEVEL |
|---|---|---|---|---|
| OS001 | WINDOWS | WINDOWS 2000 SERVER | - | FP4 |
| OS002 | WINDOWS | WINDOWS 2003 SERVER | - | FP1 |
| OS003 | LINUX | REDHAT ENTERPRISE LINUX | 4 | - |

● ADMINISTERED MIDDLEWARE LIST

| ID | MIDDLEWARE | VERSION | OS TYPE |
|---|---|---|---|
| MW001 | WEBSPHERE APPLICATION SERVER | 6.0 | WINDOWS |
| MW002 | WEBSPHERE APPLICATION SERVER | 6.1 | WINDOWS |
| MW003 | WEBSPHERE APPLICATION SERVER | 6.0 | LINUX |
| MW004 | DB2 ESE | 8.2 | LINUX |

FIG. 5

• OS PROVISIONING SUMMARY DATA — 230

| OSPROV SUMMARY ID | SUBJECT ADMIN. ID | SUBJECT OS ID | MANUAL INSTALLATION TIME (SEC) |
|---|---|---|---|
| PROS001 | A0001 | OS001 | 3600 |
| PROS002 | A0001 | OS002 | 3600 |
| PROS003 | A0001 | OS003 | 4800 |

234

| AVERAGE AUTOMATIC INSTALLATION TIME | MAX. AUTOMATIC INSTALLATION TIME | MIN. AUTOMATIC INSTALLATION TIME | NO. OF SUCCESSES | NO. OF FAILURES |
|---|---|---|---|---|
| 2550 | 2855 | 2410 | 10 | 0 |
| 2615 | 2760 | 2630 | 35 | 1 |
|  |  |  | 0 | 0 |

235

• OS PROVISIONING EXECUTION RECORD DATA — 232

| EXECUTION ID | SUBJECT ADMIN. ID | SUBJECT OS ID | START DATE OF INSTALLATION | END DATE OF INSTALLATION |
|---|---|---|---|---|
| EXEPROS001 | A0001 | OS001 | 2008/01/08 10:00:10 | 2008/01/08 10:45:30 |
| EXEPROS002 | A0001 | OS001 | 2008/01/09 09:30:50 | 2008/01/09 10:10:15 |
| EXEPROS003 | A0001 | OS002 | 2008/01/09 09:30:55 | - |

FIG. 6

METHOD AND APPARATUS FOR OPTIMIZING LEAD TIME FOR SERVICE PROVISIONING

FIELD OF THE INVENTION

This invention relates generally to the field of information technology, and more particularly to optimizing a service provisioning plan in a data center.

BACKGROUND OF THE INVENTION

Provisioning technology is technology that allows information technology (IT) resources such as servers and network devices to be used effectively and efficiently. It is also possible automatically to build the environment using provisioning technology, for example, installing/uninstalling the operating system (OS), installing/uninstalling middleware, performing environmental configuration, etc.

Reducing the provisioning time is typically done by analyzing user request trends, forming groups of commonly requested configurations in advance, and allocating resources to pools. At present, the user's requested service commencement time equals the provisioning commencement time. There are no functions to determine or predict the time taken to install and configure the requested configurations. It has not been possible to estimate the time taken for manual recovery in the case of provisioning failure. When installing from scratch, provisioning takes time. There is therefore a need for determining and predicting the provisioning preparation commencement time.

In order to actually apply provisioning to allow several users to share common IT resources, appropriate scheduling and an understanding of the state of resource use is necessary. Further, it is essential to give end users an accurate time for when the services will begin, for example, when installing and configuring will be completed, etc., and guarantee a minimum service provision. When sharing and reusing resources, unless one has accurate knowledge of the service occupancy time and idle time of the resources, the amount of time that is wasted without directly contributing to the service increases. If there are a large number of machines to be managed, this has an effect on business. Furthermore, if it happens that automatic provisioning fails, it may be necessary to build the environment manually, and there must be a plan with the necessary leeway to sufficiently account for this scenario. There is a need to solve these problems.

SUMMARY OF THE INVENTION

Briefly stated, a method for optimizing lead time for service provisioning for a request from a customer includes storing a record of installation and configuration times for each hardware and software configuration in a database, and then calculating success rates and failure rates for each hardware and software configuration. A manual installation time for the request is set in the event of failure. The necessary time to prepare the system fulfilling the customer request is then determined and displayed.

When building a server or environment using provisioning technology, the tasks performed in the past are recorded in detail, and by using this statistical data, an estimate of installation time in the case of future installations is arrived at, which assists in forming a schedule of the optimal IT resource use plan. Additionally, by applying internal and external factors as statistical parameters, plans are formulated according to the business impact and service level. By taking into account trends in user requests for provisioning in the past, the provisioning time is reduced and speedy service provisioning is enabled by taking into account trends in user requests for provisioning in the past, and preparing the commonly-requested configurations in advance.

According to an embodiment of the invention, a method for optimizing lead time for service provisioning for a request from a customer includes the steps of: (a) storing a record of installation and configuration times for each hardware and software configuration in a database; (b) calculating success rates and failure rates for each hardware and software configuration from step (a); (c) setting a manual installation time in the event of failure; and (d) determining the necessary time to prepare the system fulfilling the customer request based on steps (a) through (c).

According to an embodiment of the invention, a system which optimizes lead time for service provisioning for a request from a customer includes storage means for storing a record of installation and configuration times for each hardware and software configuration in a database; calculation means for calculating success rates and failure rates for each hardware and software configuration in the database; means for setting a manual installation time for the request in the event of failure; and determination means for determining the necessary time to prepare the system fulfilling the customer request based on the success rates and failure rates for each hardware and software configuration in the database and the manual installation time.

According to an embodiment of the invention, a program product for optimizing lead time for service provisioning for a request from a customer causes a computer system to execute the steps of: (a) storing a record of installation and configuration times for each hardware and software configuration in a database; (b) calculating success rates and failure rates for each hardware and software configuration from step (a); (c) setting a manual installation time for the request in the event of failure; and (d) determining the necessary time to prepare the system fulfilling the customer request based on steps (a) through (c).

BRIEF DESCRIPTION OF THE DRAWINGS

FIG. 4 shows an example of storing the resource initial data according to an embodiment of the invention.

FIG. 5 shows an example of storing the resource initial data according to an embodiment of the invention.

FIG. 6 shows an example of OS provisioning summary data according to an embodiment of the invention.

DETAILED DESCRIPTION OF THE PREFERRED EMBODIMENT

The present invention optimizes an IT resource provisioning plan taking into account recovery time, which has the advantages of optimizing IT resource utilization ratios, achieving certainty in ensuring commencement of services, providing service speedily by predicting and preparing a provisioned environment in advance, taking into account staff schedules with respect to recovery time, and securing a proper recovery time.

Problems with existing systems include increasing idle time of IT resources, risks in failing to meet service commencement times due to installation problems, uncertainty of service commencement times (periods) due to increasing provisioning time, and difficulty in securing human resources.

Figure 1:
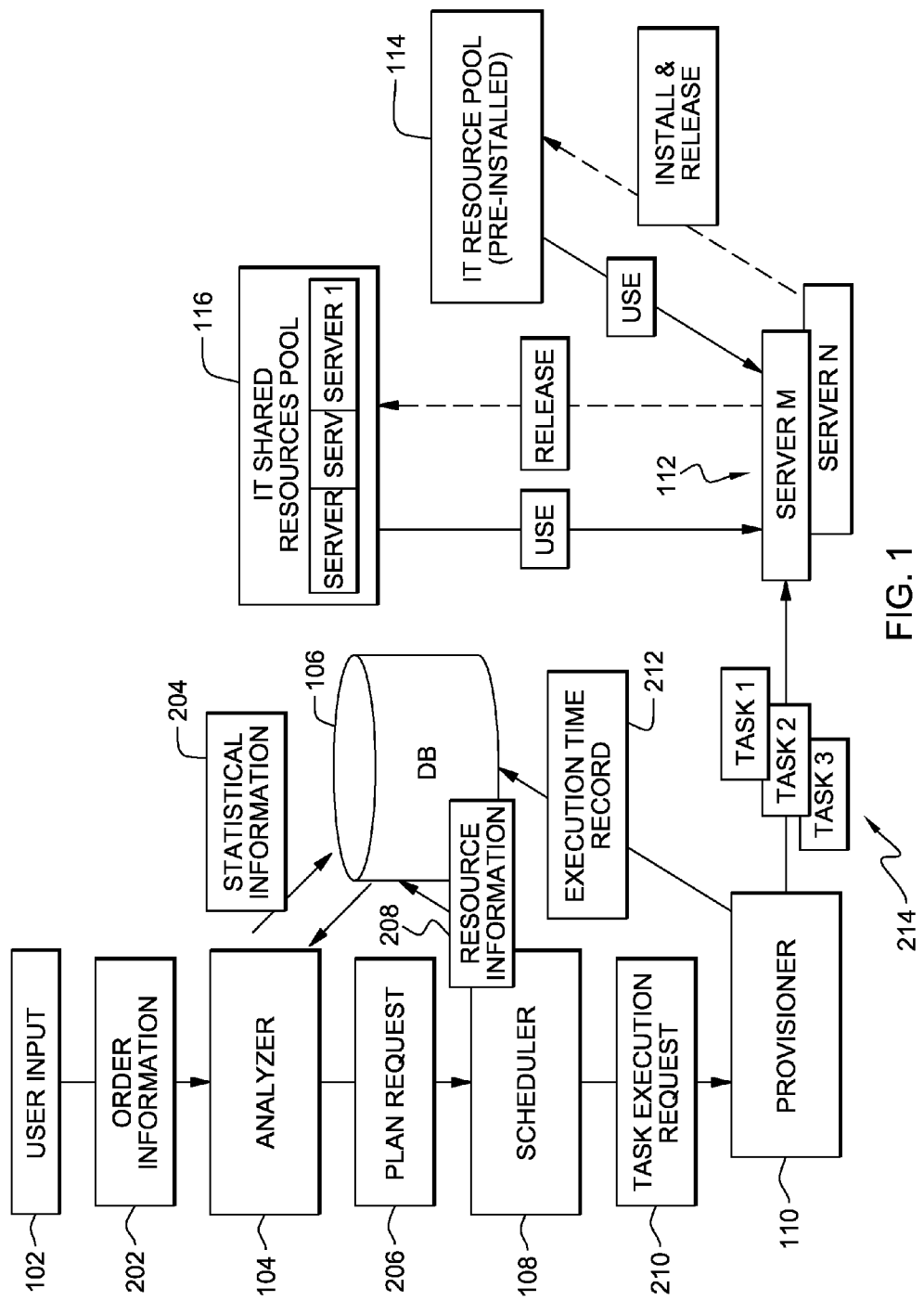
FIG. 1 shows a system diagram of an embodiment of the invention.

Referring to FIG. 1, a system diagram of an embodiment of the invention is shown. A user input 102 sends order information 202 to an analyzer 104. Analyzer 104 sends statistical information 204 to a database 106 and a plan request 206 to a scheduler 108. Statistical information 204 preferably includes IT resource data, statistical information, manual execution data, and human resource data.

Analyzer 104 preferably functions as follows. It receives resource requests from users, i.e., H/W, S/W, service commencement date/time, and service completion date/time. It obtains past execution summary data with respect to the requested H/W and S/W combinations and calculates the overall predicted provisioning time. It takes into account user's service level (Gold/Silver/Bronze), safety margins, and recovery time according to past execution results (no. of successes and failures). It then sends execution plan request to the scheduler 108.

Scheduler 108 preferably functions as follows. It receives the execution plan request from the analyzer 104, after which it obtains the unused H/W resources and human resources from the database 106 based on the predicted provisioning time obtained from the analyzer 104, and creates and registers the execution plan in database 106. Scheduler 108 then decides the date/time to begin provisioning by calculating backwards from the service commencement date requested by the user, according to the predicted provisioning time. When the execution date/time arrives, the provisioning tasks are executed.

Based on the plan request 206, scheduler 108 sends resource information 208 to database 106 and sends a task execution request 210 to a provisioner 110. Provisioner 110 sends an execution time record 212 to database 106 and tasks 1, 2, and 3 (shown at 214) to a server M or a server N (shown at 112). Servers M and N have access to a pre-installed IT resources pool 114 and IT shared resources pool 116. A standby server for new installation would be in IT shared resources pool 116. Servers M and N use and release IT resource pool 114 and IT shared resources pool 116 as necessary. The pre-installed environments are stored as pools, e.g., a WINDOWS® pool, a LINUX® pool, a WAS pool, a DB2 pool, etc.

Figure 2:
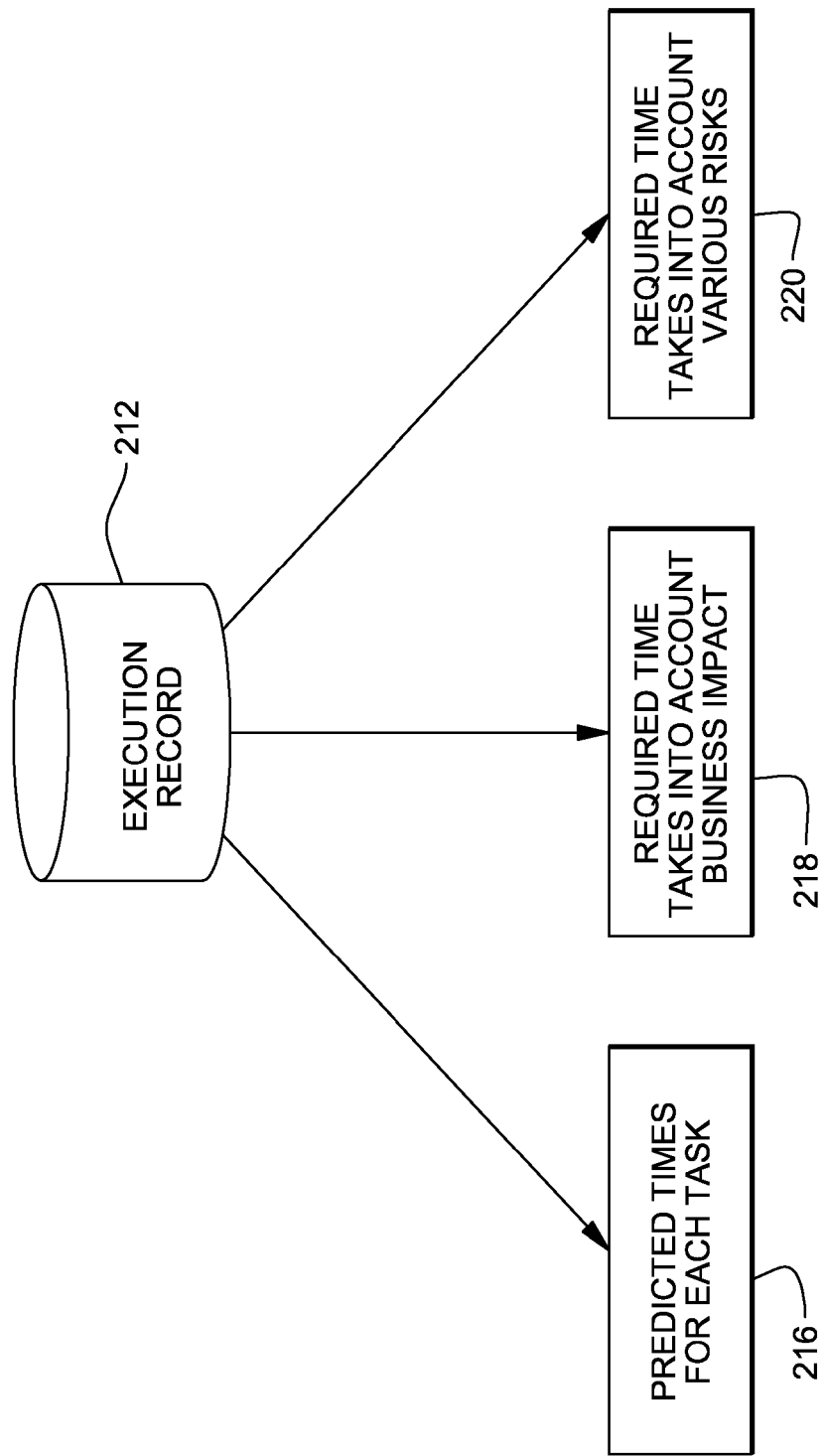
FIG. 2 shows a graphical representation of an execution record according to an embodiment of the invention.

Referring to FIG. 2, execution record 212 preferably includes various items such as predicted times for each task 216, required time takes into account business impact 218, and required time takes into account various risks 220. The predicted times for each task 216 preferably includes the predicted times by task for each OS (operating system), each middleware, each application, all configurations, and for each subject machine. The required time 218 preferably includes both large business impact, e.g., the predicted time plus the manual installation time, and medium business impact, e.g., the predicted time multiplied by 1.5. The required time 220 preferably includes the geographical location of the data center and the existence of human resources.

The start and end times of the tasks that perform automatic provisioning and de-provisioning are stored in database 106 (FIG. 1). The types of devices subject to the tasks at these times are also recorded. When tasks are executed repeatedly, the execution times of the tasks, as well as the combinations of and information about subject devices and execution environments are accumulated.

Next, when executing a task for which statistical information exists, the predicted times can be calculated using the past statistical distribution. Thus, by calculating backwards from the time the end user wants services to commence, it is possible to provide an accurate estimate of when (how many days/hours beforehand, etc.) provisioning should be executed in order to be in time for service commencement. In addition, when executing a combination of several tasks, as well as being able to give an estimate combining the statistical data, it is also possible to give an estimate of lead time, taking into account the inherent risks. It is possible to calculate an even more accurate estimate if links can be made with the statistical data of execution times for a certain number of tasks in a series.

It is possible to take into account the combinations of tasks and subject devices in the estimate. In some cases it may not be necessary to give much consideration to risks associated with devices having good installation results in the past, but it is necessary to perform estimates taking into account maximum risks when executing tasks with respect to devices that do not have proven installation results. In this case, estimates are made applying weighting to the statistical information. Maximum risk consideration means forming a plan that leaves sufficient time for manual installation in the worst case scenario that automatic installation fails.

By providing statistical estimates of tasks at a detailed level and considering their combinations, it is possible to calculate a range of patterns of provisioning predictions. Further, when service provision is finished, it is essential to promptly release the resources and enable them to be used for the next service. One can estimate de-provisioning times, i.e., resource initialization, etc. in the same way.

For the provisioning plan, the resources need to be in a useable condition at the time provisioning is begun, and they must be initialized and released at the time de-provisioning is concluded. By keeping the idle time X ("times") the resource numbers during the interval between these services to a minimum, the shared resources can have their use optimized, and this can be expected to reduce unnecessary idling costs compared to the prior art.

If one analyses the trends of requests from users, predicting in advance which configurations often require provisioning (for each OS, middleware, etc.) and keeps idle machines on standby in a pre-installed state, in the event that the relevant request is made, it will be possible to provide the environment to the user with only minimum configurations.

In terms of business aspects, it is possible to take into account both cases when it is necessary to give strict estimates for each service level, and cases when this is not necessary. In the case that there would be a large impact on business if provisioning is not performed in time for the start of the services, one should plan installation with maximum risk consideration from the start. Further, geographical conditions etc. may comprise another external factor. With respect to unstable locations (places often subject to unforeseeable power outages, service interruptions etc.) parameters are set that take this into account, and estimated times are calculated. The more these systems are used, the more statistical data is accumulated, enabling provision of more accurate installation plans and estimates for the future.

Figure 3:
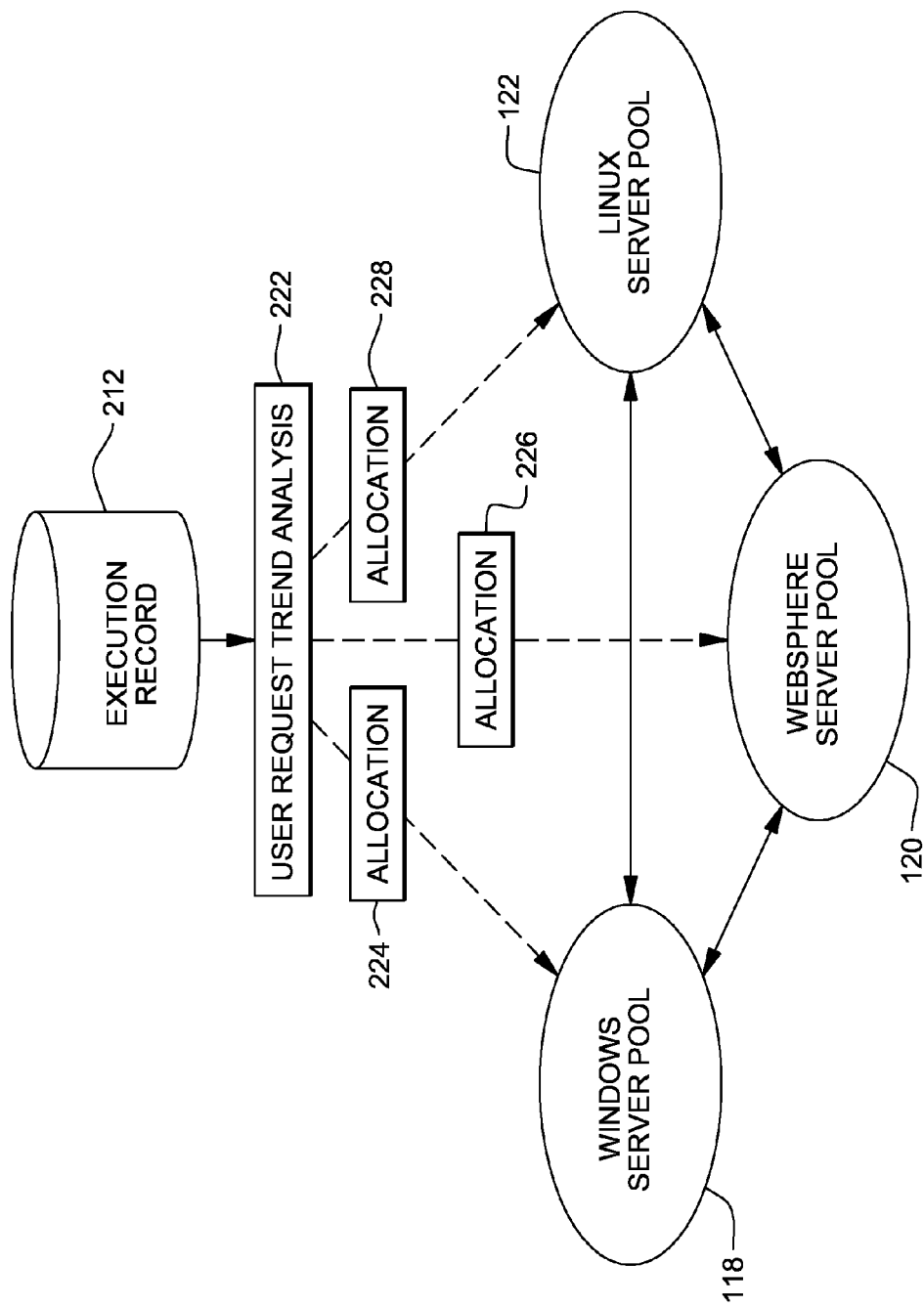
FIG. 3 shows a graphical representation of how the execution record is used to analyze and allocate various server pools according to an embodiment of the invention.

Referring to FIG. 3, the server numbers in each pool vary dynamically according to user request trends. The execution record 212 is used by analyzer 104 (FIG. 1) to prepare a user request trend analysis 222 which is then preferably used for an allocation 224 into a WINDOWS® server pool 118, an allocation 226 into a websphere server pool 120, and a LINUX® server pool 122.

FIGS. 4 and 5 show examples of storing the resource initial data (resource information 208 from FIG. 1) into database 106 (FIG. 1).

Referring to FIG. 6, an example of the provisioning summary data (when installing the OS) is shown. Block 230 shows the execution summary of all combinations of machines and OS's. Block 232 shows the actual provisioning execution results which are recorded. The aggregate of the actual provisioning execution results of block 232 is shown in block 234. Note in row 235 that since there is no data for combinations not yet performed, it is necessary to calculate predicted values.

Figure 7:
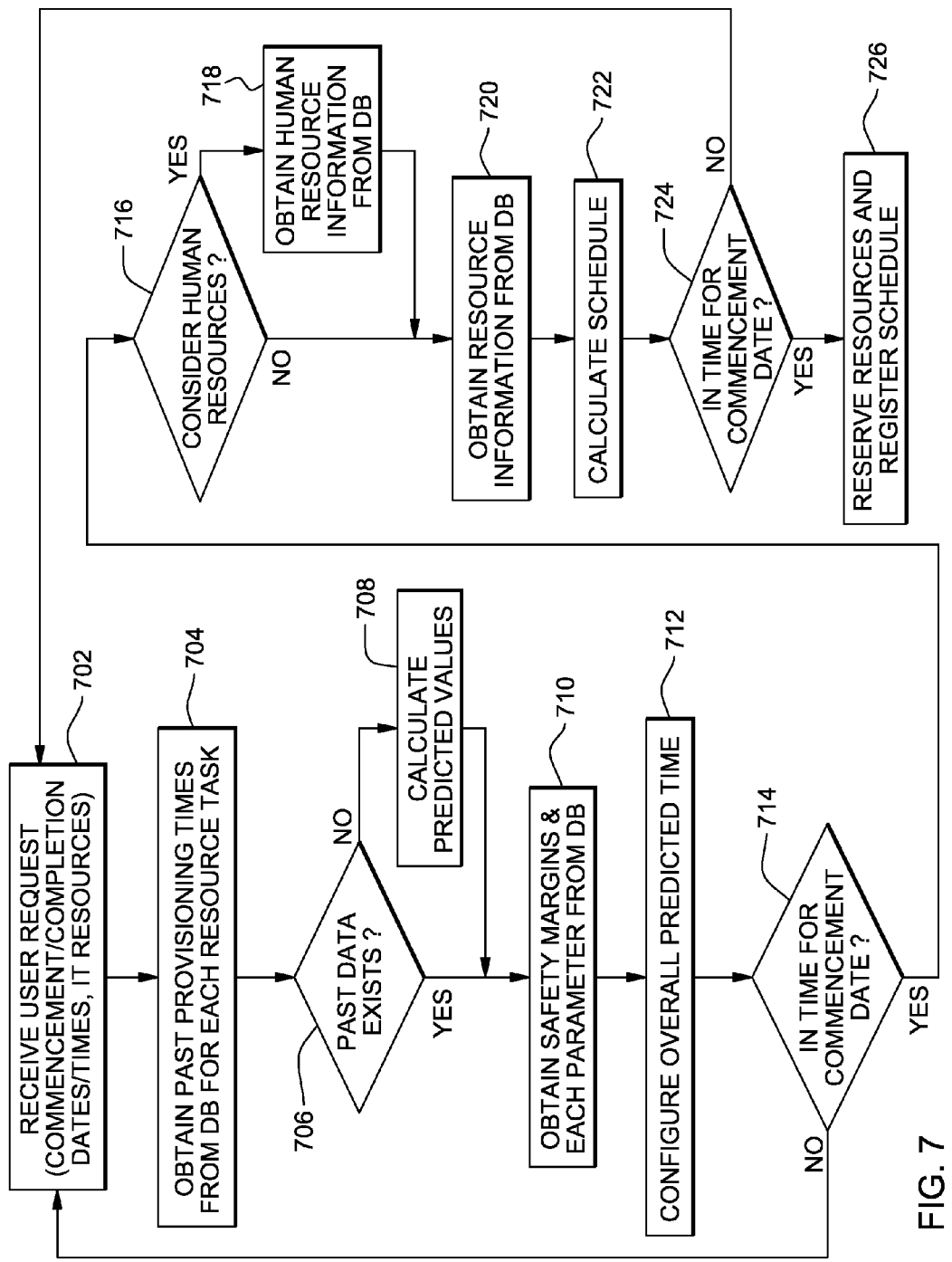
FIG. 7 shows a flowchart showing resource reservation according to an embodiment of the invention.

Referring to FIG. 7, a resource reservation flowchart is shown. In step 702, the user request is received. In step 704, the past provisioning times are obtained from the database 106 (FIG. 1) for each resource task. In step 706, the system checks to see whether past data exists, If not, predicted values are calculated in step 708. If past data exists, the system proceeds directly to step 710, where the safety margins and each parameter are obtained from database 106 (FIG. 1). The overall predicted time is then configured in step 712.

If the predicted time is not in time for the commencement date (step 714), system control reverts back to step 702. If the predicted time is in time for the commencement date (step 714), the system then determines whether to consider human resources in step 716. If human resources are considered, the human resource information is obtained from database 106 (FIG. 1) in step 718. If not, other resource information is obtained in step 720, after which the schedule is calculated in step 722. The system checks to determine if the schedule is in time for the commencement date in step 724, and if not, system control reverts back to step 702. If the calculated schedule is in time for the commencement date, resources are reserved and the schedule is registered in step 726.

Figure 8:
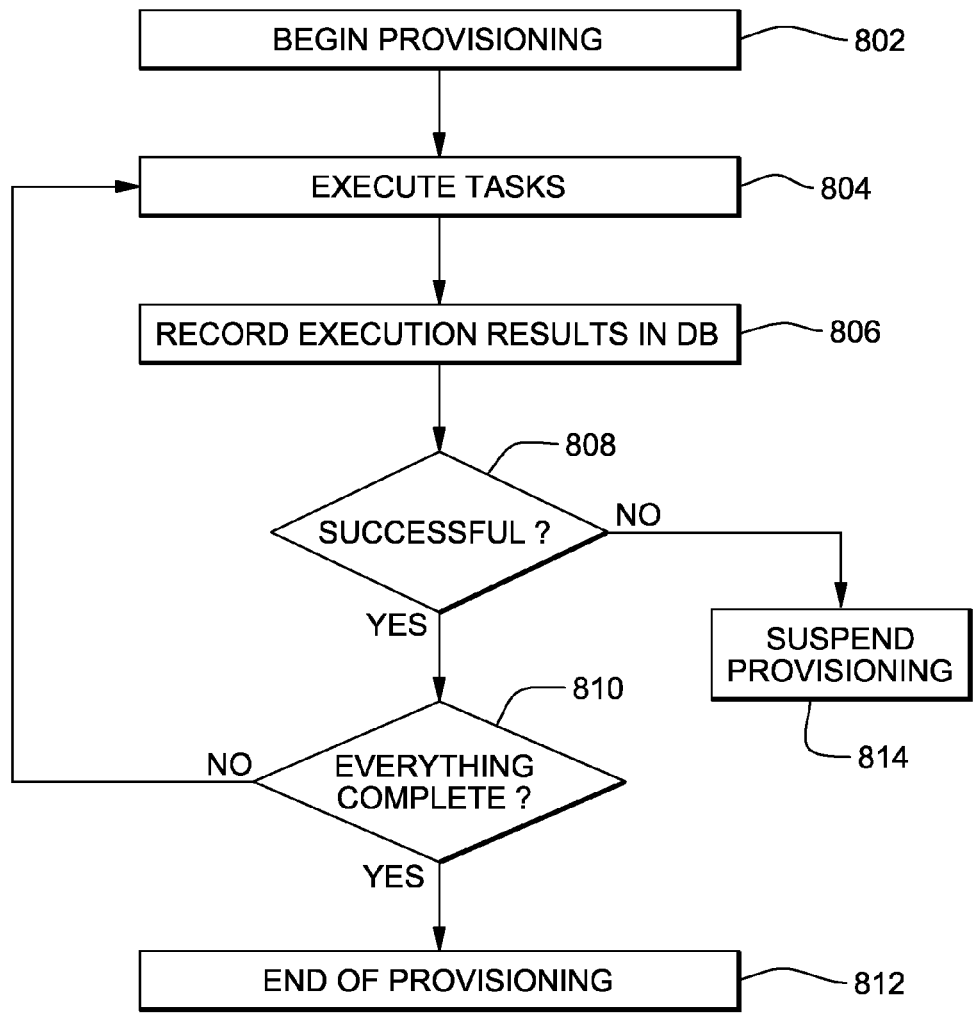
FIG. 8 shows a flowchart showing the provisioning cycle according to an embodiment of the invention.

Referring to FIG. 8, the flowchart for provisioning according to an embodiment of the invention is shown. Provisioning begins in step 802, and the tasks are executed in step 804. Execution results are recorded in database 106 (FIG. 1) in step 806, after which the system checks to see if the execution results were completed and recorded in the database 106 (FIG. 1). If not, provisioning is suspended in step 814. If successful, the system checks to see if everything is complete in step 810. If not, tasks are again executed in step 804 until everything is complete in step 810, whereupon provisioning ends in step 812.

The following configurations are preferably installed during de-provisioning. The commonly requested configurations are prepared in advance during de-provisioning (server release time) and kept on standby. During the next provisioning it is possible to begin the service simply by starting it up and performing the minimum configurations. The pre-installed environments are stored as pools, e.g., WINDOWS® pool, LINUX® pool, WAS pool, DB2 pool, etc., as shown in FIG. 3. The server numbers in each pool vary dynamically according to user request trends. If using a virtual environment, store as virtual images.

The process for predicting provisioning time preferably includes the following. The record of execution times is stored in database 106 (FIG. 1), e.g., the subject H/W, machine types, specifications, etc., the OS to be installed, middleware, applications, and configurations. The installation time values according to the machine are used as parameters, depending on the machine type, CPU, and memory size. Slow machines are provided with a factor of 1.5 times for planning purposes. The manual installation time is preferably stored in advance. Safety margins are calculated from the provisioning success and failure rates. In the case of configurations which commonly fail or new installation patterns, add on the manual installation time.

The resource initial data preferably includes the data related to machines (H/W) subject to provisioning, the Product type and model name, the specifications (number of CPUs, memory, storage, etc.), the data related to S/W resources, the type of OS and version, the type of middleware (by OS) and version, and the data related to manual execution time (initial input), i.e., the time taken for manual installation, to produce an estimate of the recovery time in the case of failure.

The following outlines how to estimate time when provisioning has not yet been performed. In a case when there is no provisioning execution data, the analyzer 104 (Fi. 1) estimates the approximate time using the following procedure. Various questions are asked: (1) has the same S/W provisioning been performed for different H/W in the past, and (2) has similar S/W provisioning been performed for the same H/W in the past? If so, using other execution data, calculate the performance ratio between different H/W and S/W and use as parameters.

For example, when WINDOWS2000®Server provisioning in HS21 has never been performed but the following information is already known:
WINDOWS2000®Server provisioning in HS20 has an average of 40 minutes,
WINDOWS2003®Server provisioning in HS20 has an average of 45 minutes, and
WINDOWS2003®Server provisioning in HS21 has an average of 42 minutes, then if we assume a proportional relation, i.e., $y=ax$, we obtain $40*42/45=37.3$ as the predictor for HS21:Win2000.

When there is a large quantity of data, the prediction is made using an approximation formula according to ordinary statistical processing. For example, supposing $y=ax+b$, then the coefficients of a and b are determined by the least-squares method using recorded data.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A method for optimizing lead time for service provisioning of servers for a customer request from a customer, comprising:
   storing a record of installation and configuration times for each hardware and software configuration on the servers in a database;
   calculating success rates and failure rates for each hardware and software configuration on the servers from the record of installation and configuration times;
   setting a manual installation time for the customer request in the event of failure; and
   determining a necessary time to prepare the servers for fulfilling the customer request based on the record of installation and configuration times for each hardware and software configuration of the servers based on the success rates and failure rates calculated, and based on the manual installation time set for the customer request in the event of failure;

wherein the necessary time to prepare the servers further takes into account staff schedules with respect to recovery times; and wherein a date to begin provisioning each hardware and software configuration on the servers is calculated backwards from a service commencement date requested by the customer according to the necessary time to prepare the servers.

2. A method according to claim 1, further comprising displaying the necessary time as determined.

3. A method according to claim 1, further comprising estimating time for the customer request when provisioning has not yet been performed for a given request, wherein estimating further includes using execution data from past occurrences when the same software provisioning has been performed for different hardware and when similar software provisioning has been performed for the same hardware, and applying statistical processing to the execution data to obtain an estimated time.

4. A method according to claim 1, further comprising accounting for large business impact which comprises the necessary time to prepare the servers plus the manual installation time.

5. A method according to claim 1, further comprising obtaining human resource information from the database before determining the necessary time to prepare the servers for fulfilling the customer request.

6. A system which optimizes lead time for service provisioning of servers for a customer request from a customer, comprising:
 storage means for storing a record of installation and configuration times for each hardware and software configuration on the servers in a database;
 calculation means for calculating success rates and failure rates for each hardware and software configuration in the database;
 means for setting a manual installation time for the customer request in the event of failure; and
 determination means for determining a necessary time to prepare the servers fulfilling the customer request based on the success rates and failure rates for each hardware and software configuration in the database and the manual installation time;
 wherein the necessary time to prepare the servers further takes into account staff schedules with respect to recovery times; and
 wherein a date to begin provisioning each hardware and software configuration on the servers is calculated backwards from a service commencement date requested by the customer according to the necessary time to prepare the servers.

7. A system according to claim 6, further comprising means for displaying the necessary time as determined by the determination means.

8. A system according to claim 6, further comprising estimation means for estimating time for the customer request when provisioning has not yet been performed for a given request, wherein the estimation means further includes means for using execution data from past occurrences when the same software provisioning has been performed for different hardware and when similar software provisioning has been performed for the same hardware, and means for applying statistical processing to the execution data to obtain an estimated time.

9. A system according to claim 8 further comprising means for obtaining human resource information from the database for use by the determination means.

10. A system according to claim 6, further comprising means for obtaining human resource information from the database for use by the determination means.

11. A program product on a non-transitory storage medium for optimizing lead time for service provisioning of servers for a customer request from a customer, the program product causing a computer system to execute:
 storing a record of installation and configuration times for each hardware and software configuration in a database;
 calculating success rates and failure rates for each hardware and software configuration from the record of installation and configuration times;
 setting a manual installation time for the customer request in the event of failure; and
 determining a necessary time to prepare the servers fulfilling the customer request based on the record of installation and configuration times for each hardware and software configuration of the servers based on the success rates and failure rates calculated, and based on the manual installation time set for the customer request in the event of failure;
 wherein the necessary time to prepare the servers further takes into account staff schedules with respect to recovery times; and
 wherein a date to begin provisioning each hardware and software configuration on the servers is calculated backwards from a service commencement date requested by the customer according to the necessary time to prepare the servers.

12. A program product according to claim 11, wherein the program product further causes the computer to execute displaying the necessary time as determined.

13. A program product according to claim 11, wherein the program product further causes the computer to execute estimating time for the customer request when provisioning has not yet been performed for a given request, wherein the step of estimating further includes using execution data from past occurrences when the same software provisioning has been performed for different hardware and when similar software provisioning has been performed for the same hardware, and applying statistical processing to the execution data to obtain an estimated time.

14. A program product according to claim 13, wherein the program product further causes the computer to execute obtaining human resource information from the database before determining the necessary time to prepare the servers for fulfilling the customer request.

15. A program product according to claim 11, wherein the program product further causes the computer to execute obtaining human resource information from the database before determining the necessary time to prepare the servers for fulfilling the customer request.

* * * * *